(12) United States Patent
Chen et al.

(10) Patent No.: US 7,151,883 B2
(45) Date of Patent: Dec. 19, 2006

(54) PHOTONIC CRYSTAL DEVICE AND METHODS

(75) Inventors: Chien-Hua Chen, Corvallis, OR (US); Sriram Ramamoorthi, Corvallis, OR (US); Donald J. Milligan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/962,825

(22) Filed: Oct. 8, 2004

(65) Prior Publication Data

US 2006/0078268 A1   Apr. 13, 2006

(51) Int. Cl.
*G02B 6/00* (2006.01)
*B29D 11/00* (2006.01)

(52) U.S. Cl. .......... 385/147; 385/129; 385/39; 216/24

(58) Field of Classification Search .......... 385/16–24, 385/129–132, 147, 39
See application file for complete search history.

(56) References Cited

U.S. PATENT DOCUMENTS

| | | |
|---|---|---|
| 5,172,267 A | 12/1992 | Yablonovitch |
| 5,335,240 A | 8/1994 | Ho et al. |
| 5,406,573 A | 4/1995 | Ozbay et al. |
| 5,440,421 A | 8/1995 | Fan et al. |
| 5,498,312 A | 3/1996 | Laermer et al. |
| 5,501,893 A | 3/1996 | Laermer et al. |
| 5,600,483 A | 2/1997 | Fan et al. |
| 5,651,818 A | 7/1997 | Milstein et al. |
| 5,689,275 A | 11/1997 | Moore et al. |
| 5,973,823 A | 10/1999 | Koops et al. |
| 5,997,795 A | 12/1999 | Danforth et al. |
| 5,998,298 A | 12/1999 | Fleming et al. |
| 6,025,115 A | 2/2000 | Komatsu et al. |
| 6,139,626 A | 10/2000 | Norris et al. |
| 6,175,337 B1 | 1/2001 | Jasper, Jr. et al. |
| 6,358,653 B1 | 3/2002 | Turberfield et al. |
| 6,358,854 B1 | 3/2002 | Fleming et al. |
| 6,392,787 B1 | 5/2002 | Cirelli et al. |
| 6,468,823 B1 | 10/2002 | Scherer et al. |
| 6,590,697 B1 * | 7/2003 | Vaganov ............... 359/296 |
| 6,593,894 B1 | 7/2003 | Biswas et al. |
| 6,704,132 B1 | 3/2004 | Dewa |
| 6,720,268 B1 | 4/2004 | Laermer et al. |
| 2001/0012149 A1 | 8/2001 | Lin et al. |
| 2002/0062782 A1 | 5/2002 | Norris et al. |
| 2002/0154403 A1 | 10/2002 | Trotter, Jr. |
| 2002/0164118 A1 | 11/2002 | Paddon et al. |
| 2003/0027426 A1 | 2/2003 | Milligan et al. |
| 2003/0118306 A1 | 6/2003 | Deliwala |
| 2006/0006787 A1 * | 1/2006 | Champion et al. ......... 313/495 |
| 2006/0124952 A1 * | 6/2006 | Milligan et al. ........... 257/99 |

FOREIGN PATENT DOCUMENTS

JP    2000-258650 A    9/2000

(Continued)

OTHER PUBLICATIONS

J. Hewitt, "Moulds Cut Photonic Crystal Costs" http://nanotechweb.org/articles/news/1/5/8/1 (May 16, 2002).

(Continued)

*Primary Examiner*—Sarah Song

(57) ABSTRACT

A photonic crystal device is fabricated by a method comprising steps of providing a substrate, providing a photonic crystal on the substrate, and etching a cavity under at least the photonic crystal, the cavity having an inner wall adapted to reflect light.

58 Claims, 5 Drawing Sheets

FOREIGN PATENT DOCUMENTS

| | | |
|---|---|---|
| JP | 2000-284136 A | 10/2000 |
| JP | 2000-314817 A | 11/2000 |
| JP | 2002-323631 A | 11/2002 |
| JP | 2002-323632 A | 11/2002 |

OTHER PUBLICATIONS

Fleming et al."All-metallic three-dimensional photonic . . . " Nature V. 417 (May 2, 2002), p. 52-55.

R. F. Service, "Building Better Photonic Crystals" SCIENCE V. 295 (Mar. 29, 2002) p. 2399.

Author unknown, "Si-based photonic crystals . . . " MIUR-Cofin project, http://fisicavolta.unipv.it/dipartimento/ricerca/fotonici/Cofin%202002%20Presentazione.pdf (2002), no month.

Y. A. Vlasov et al., "On-chip natural assembly of silicon photonic bandgap crystals," Nature, V. 414 (Nov. 15, 2001), pp. 289-293.

S. Lin et al., "Silicon Three-dimensional Photonic Crystal and its Applications" Sandia National Lab report SAND2001-3612 (Nov. 2001).

Gasser et al. "Real-Space Imaging of Nucleation and Growth in Colloidal Crystallization" Science V. 292 (Apr. 13, 2001) pp. 258-262.

D. J. Norris et al., "Chemical Approaches to Three-Dimensional Semiconductor Photonic Crystals" Adv. Mater., V. 13, No. 6 (Mar. 16, 2001), pp. 371-376.

Parker et al. "Photonic Crytstals" Aug. 2000 http://physicsweb.org/article/world/13/8/9/1.

Wang et al., "Direct nanoimprint of submicron organic light-emitting structures" Appl. Phys. Letters V. 75, n.18 (Nov. 1, 1999) pp. 2767-2769.

Y. A. Vlasov et al., "Synthesis of Photonic Crystals for Optical Wavelengths from Semiconductor Quantum Dots" Adv. Mater. V. 11, No. 2 (1999) pp. 165-169, no month.

G.T.A. Kovacs et al., "Bulk Micromachining of Silicon" Proc. IEEE, vol. 86 No. 8 (Aug. 1998), pp. 1536-1551.

Astratov et al. "Photonic band gaps in 3D ordered . . . " Phys. Let. A 222 (Nov. 11, 1996) pp. 349-353.

McGurn et al."Photonic band structures of two- and three-dimensional . . . " Phys. Rev. B V. 48(23) Dec. 15, 1993, pp. 17576-17579.

Yablonovitch et al. "Photonic Band Structure: The Face-Centered Cubic Case . . . " Phys. Rev. Letters V. 67(17) Oct. 21, 1991, pp. 2295-2298.

Ho et al. "Existence of a Photonic Gap in Periodic Dielectric Structures" Phys. Rev. Letters V. 65(25) Dec. 17, 1990, pp. 3152-3155.

\* cited by examiner

PHOTONIC CRYSTAL DEVICE AND METHODS

CROSS-REFERENCE TO RELATED APPLICATION

This application is related to co-pending and commonly assigned application Ser. No. 10/885,051, filed Jul. 6, 2004, the entire disclosure of which is incorporated herein by reference.

TECHNICAL FIELD

This invention relates generally to photonic crystal devices and methods for fabricating such devices.

BACKGROUND

Photonic crystals are spatially periodic structures having useful electromagnetic wave properties, such as photonic bandgaps. In principle, the spatial periodicity of a photonic crystal can be in one, two, or three dimensions. There is especially high interest in developing technology of artificial photonic crystals that are useful in new and improved functional photonic devices, especially for the infrared and visible-light portions of the electromagnetic spectrum. Functional devices using photonic crystals, such as selective reflectors, filters, optical couplers, resonant cavities, delay lines, and waveguides have been proposed and/or fabricated.

A photonic crystal may be provided on a substrate by forming the photonic crystal in place or by placing the photonic crystal on a substrate. Silicon is a convenient substrate on which to build a photonic crystal, especially because of its compatibility with semiconductor-type processing methods and processing equipment. For some applications of photonic crystals, conductive connections connect to the photonic crystal and may also be carried by the substrate. Photonic crystals can emit or direct light into undesired directions and such light may be lost. While some methods for making photonic crystal devices are known, improved methods for mass-production fabrication of photonic crystal devices are needed.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

Figure 1:
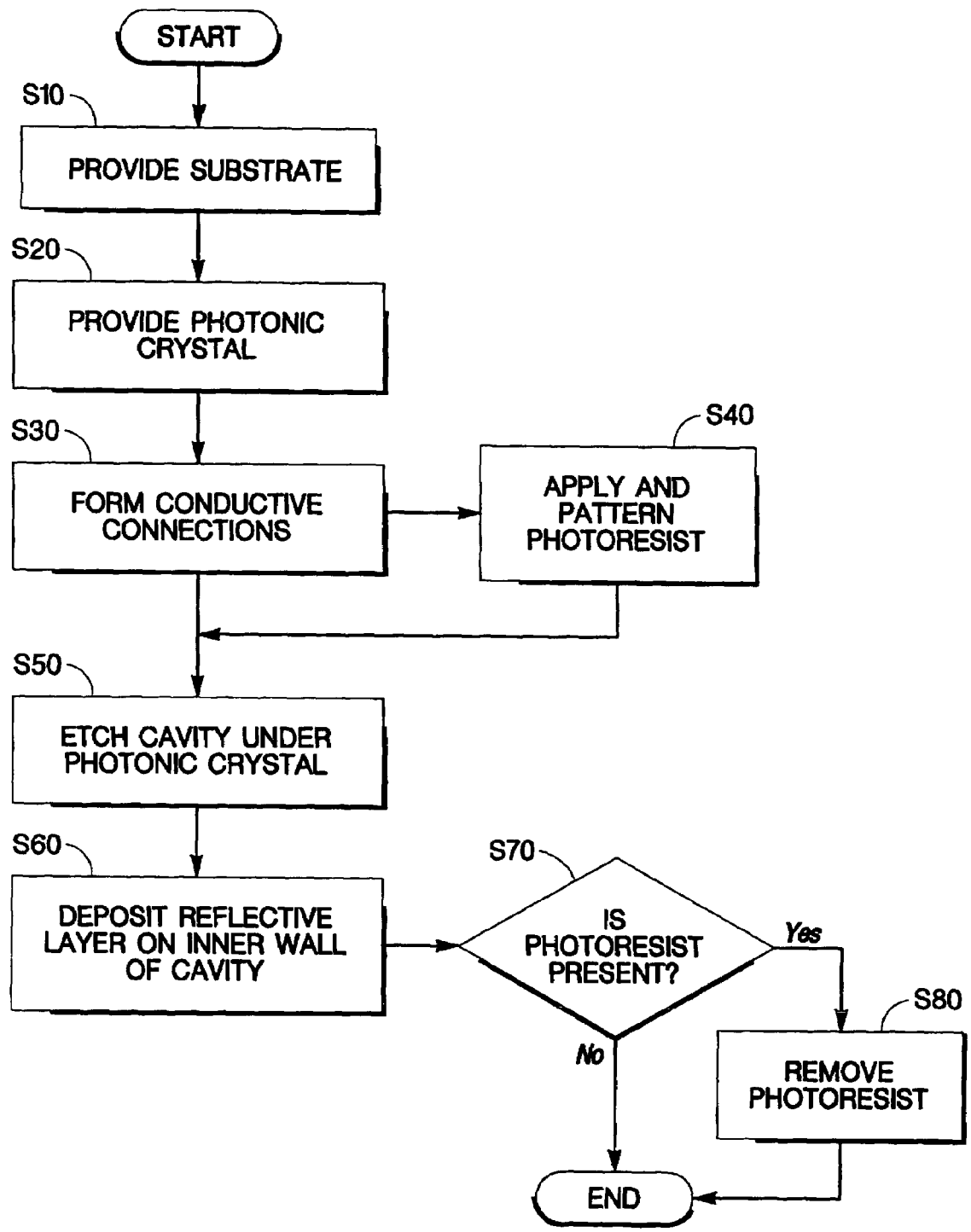
FIG. 1 is a flowchart of an embodiment of a method for fabricating a photonic crystal device.

For clarity of the description, the drawings are not drawn to a uniform scale. In particular, vertical and horizontal scales may differ from each other and may vary from one drawing to another. In this regard, directional terminology, such as "top," "bottom," "front," "back," "leading," "trailing," etc., is used with reference to the orientation of the drawing figure(s) being described. Because components of the invention can be positioned in a number of different orientations, the directional terminology is used for purposes of illustration and is in no way limiting.

Except for a mention of "resonant cavities" in the Background section hereinabove, the term cavity throughout the remainder of this specification and the appended claims refers to a hollowed-out space in a material body.

Throughout this specification and the appended claims, the term "processing light" denotes any manner of affecting light (photons) that may be accomplished using a photonic crystal, such as emitting, refracting, focusing, defocusing, filtering, transmitting, reflecting, diffracting, scattering, directing, collimating, switching, modulating, or the like, or selectively performing any such functions on light in any range of wavelengths of the electromagnetic spectrum. However, the potential uses for photonic crystal devices, including both present uses and those uses yet to be discovered, are too numerous to list exhaustively, and it is not intended that the definition of "processing light" be limited to those functions explicitly listed above.

While embodiments are described in this specification, the drawings, and the appended claims with a photonic crystal on a substrate, the term "on the substrate" should be understood to mean that the photonic crystal may be on or in the substrate or partially in the substrate. For example, in various embodiments, the top surface of the photonic crystal generally faces upward in relation to the top surface of the substrate and may be positioned above, flush with, or below the top surface of the substrate, depending on how the photonic crystal is formed. All such configurations should be considered to be encompassed within the meaning of "on the substrate."

From the present description and accompanying drawings, it will be seen that one aspect of the present invention is an embodiment of a method for fabricating a photonic crystal device. An embodiment of a photonic crystal device is fabricated by a method comprising steps of providing a substrate, providing a photonic crystal on the substrate, etching a cavity into the substrate under at least the photonic crystal, the cavity having an inner wall adapted to reflect light. The method may also include forming conductive connections electrically coupled to the photonic crystal. The inner wall may be adapted to reflect light by depositing a reflective layer on the inner wall of the cavity. The photonic crystal itself may be formed by any of the known methods for forming photonic crystals; such methods are described in more detail hereinbelow.

A photonic crystal device made by the methods of the present invention may also be integrated with electronic or other optoelectronic circuitry carried on a common substrate, forming an integrated circuit that can be used in a large variety of applications.

The substrate may be a semiconductor wafer, such as a silicon wafer substrate, for example. Many methods similar to those used in semiconductor processing are available for use while fabricating a photonic crystal device with such a substrate.

To etch a cavity under at least the photonic crystal, a relatively thick layer of photoresist may be applied over the photonic crystal and conductive connections, and the layer of photoresist may be patterned before etching the cavity. The photoresist may be removed after depositing a reflective layer on the inner wall of the cavity. Alternatively, other methods of etching the cavity which do not require photoresist may be employed, such as focused ion-beam etching or various laser-assisted etching methods.

The reflective layer deposited on the inner wall of the cavity serves to reflect light, including light processed by the photonic crystal. Since the shape of the cavity affects the directions that light is reflected, various shapes of cavities may be employed for particular applications. For many applications, the process of etching a cavity under at least the photonic crystal is advantageously controlled to form a cross-sectional profile corresponding to a conic section. For example, the cross-sectional profile may be formed as a circular arc, an elliptical curve, a hyperbolic curve, or a parabolic curve. Those skilled in optics will recognize that a parabolic cross-sectional profile has some advantage for avoiding spherical aberration, for example, but such aberrations are not equally important for all applications.

If desired, the cavity etched under at least the photonic crystal may form a curved surface of revolution, so that the cavity has rotational symmetry about its axis. Cavities formed with such rotational symmetry may have a conical shape, a spheroidal shape, an ellipsoidal shape, a hyperboloidal shape, or a paraboloidal shape, for example. A paraboloidal cavity having a focal point within the photonic crystal will generally reflect light from the photonic crystal along parallel rays (in principle, extending toward infinity). More generally, a cavity of any shape which has a focal point disposed along an axis passing through the photonic crystal may be used for many applications of a photonic crystal device. For example, hyperboloidal, elliptical, and spheroidal cavity shapes have focal points that may be thus disposed. Similarly, a cavity of any shape which has a focal point disposed within the photonic crystal may be used for many applications.

Various methods may be used for etching a cavity under at least the photonic crystal, including anisotropic etching methods and isotropic etching methods. Details of such methods are described hereinbelow. Generally, for most applications, the depth of the cavity is not critical, and may be, for example, a few nanometers to a few tens of micrometers, or even more, depending on the application. The step of depositing a reflective layer on the inner wall of the cavity may performed by depositing a reflective metal film, such as aluminum or an alloy of aluminum, for example.

A particular embodiment of a method for fabricating a photonic crystal device is illustrated by the flow chart of FIG. 1, in which various steps are denoted by reference numerals S10, S20, . . . S80, and the steps related to the use of photoresist (S40, S70, and S80) are included. FIGS. 5 through 12 are cross-sectional side elevation views of embodiments of a photonic crystal device, illustrating various stages of fabrication.

As shown in FIG. 1, this embodiment of the method starts by providing a substrate (S10). The method continues with the step (S20) of providing a photonic crystal on the substrate. The photonic crystal itself may be provided as previously formed and placed on the substrate, or the photonic crystal may be formed in place. The photonic crystal may be formed by any of the known methods for forming photonic crystals For example, a three-dimensional photonic crystal may be formed by a process that starts with preparation of a double-polished silicon wafer with a silicon oxide layer formed on its top surface. A layer of tungsten about 150 nanometers thick is deposited (e.g., by plasma-enhanced chemical vapor deposition) and then patterned and etched to form a first uniform set of parallel tungsten regions about 100 nanometers wide with about 350 nanometer pitch. An oxide such as TEOS oxide is deposited to about 500 nm, filling the spaces between tungsten regions and covering the tungsten regions. Chemical-mechanical polishing is used to remove an upper portion of the TEOS and planarize the surface with exposed 140 nanometer tungsten regions and TEOS filling the spaces between them. Another PVD tungsten layer about 150 nm thick is deposited and then patterned and etched to form a second uniform set of parallel tungsten regions about 100 nanometers wide with about 350 nanometer pitch, oriented orthogonally to the first set. A second TEOS layer is deposited and polished by CMP in analogous manner to the first tungsten layer, leaving exposed 140 nanometer tungsten regions with TEOS filling the spaces between them. A third tungsten layer is made similarly to the first two layers, with its patterned tungsten regions parallel to those of the first layer (but offset by one-half pitch relative to the first layer), with a third TEOS layer, filling the spaces between the tungsten regions and again similarly planarized. Similar sequences of depositions, patterning, and polishing may be repeated any number of times to form a desired number of layers, building up the three-dimensional periodic crystallographic structure of a photonic crystal. A final layer of TEOS oxide may be patterned and vias etched through it to allow electrical contact to the photonic crystal by metallic conductors deposited in the vias. Conductive metal traces may be formed to connect to the conductive vias. Masking steps are used to protect the photonic crystal and its conductive connections while a dry directional etch is performed to remove overlying material, etching down to the silicon wafer. The three-dimensional photonic crystal remains, disposed on the silicon wafer substrate. Various other methods are known to those skilled in the art for forming artificial photonic crystals with one-, two-, or three-dimensional spatial periodicity, and such methods are described in the existing photonic-crystal literature, both patent literature and non-patent literature.

Figure 5:
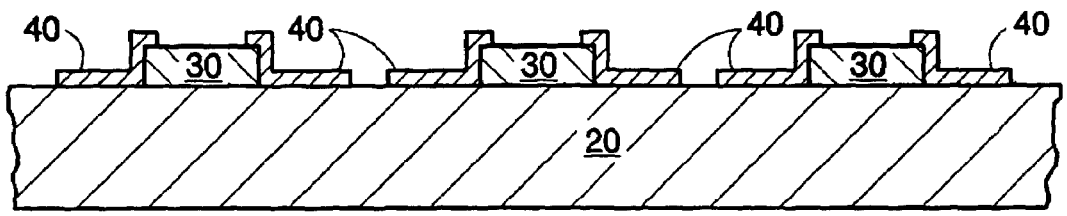
FIGS. 5 through 11 are cross-sectional side elevation views of embodiments of a photonic crystal device, illustrating various stages of fabrication according to an embodiment of a fabrication method.

When a photonic crystal has been provided, the fabrication method embodiment illustrated by FIG. 1 may continue with step S30 of forming conductive connections electrically coupled to the photonic crystal if such connections are required. For example, conventional methods of depositing and patterning conductive connections may be used to form conductive metallic leads in contact with portions of the photonic crystal. FIG. 5 shows a cross-sectional side elevation view of embodiments of a photonic crystal device after step S30, with photonic crystals 30 formed on substrate 20 with its conductive connections 40.

Figure 6:
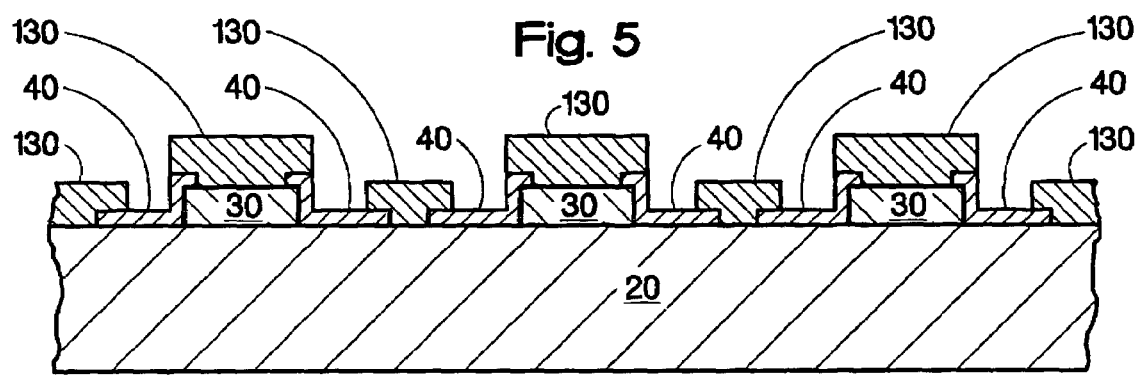

In some embodiments of the method, a thick layer of photoresist may be applied and patterned (step S40) over the photonic crystal and conductive connections. A conventional photoresist may be used, e.g., a resist that masks effectively for the etch to be employed. The photoresist is applied to a thickness sufficient to protect the photonic crystal and its conductive connections. The thickness may be about a micrometer, for example. Such a photoresist layer may be applied and patterned, for example, to use conventional photolithography to define the regions to be etched in step S50. FIG. 6 shows a cross-sectional side elevation view of embodiments of a photonic crystal device after step S40, showing patterned photoresist 130. If photoresist is applied and patterned, any photoresist remaining after etching and any deposition processes may be removed later.

Figure 7:
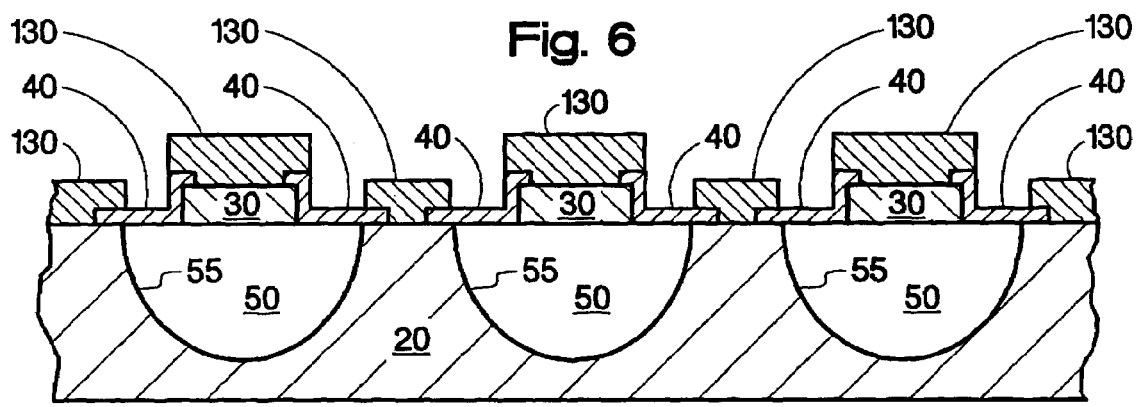

In step S50, a cavity is etched under at least the photonic crystal. Generally, the top of this cavity may extend laterally beyond the photonic crystal, e.g., if it is desired that light reflected from within the cavity be directed past the lateral edges of the photonic crystal. When etching the cavity in step S50, the cross-sectional profile of the inner wall of the cavity is controlled to form a desired cross-sectional profile. FIG. 7 shows a cross-sectional side elevation view of embodiments of a photonic crystal device after step S50, showing cavities 50 etched into substrate 20 under at least the photonic crystals 30. The cavities 50 have inner walls 55 that have the desired cross-sectional profile.

As mentioned above, various methods may be used for etching a cavity under at least the photonic crystal, including anisotropic etching methods and isotropic etching methods. A variety of suitable etching methods has been described in the review article by G. T. A. Kovacs et al., "Bulk Micromachining of Silicon," Proceedings of the IEEE, Vol. 86, No. 8, (August 1998), pp. 1536–1551, the entire disclosure of which is incorporated herein by reference.

Among methods that may be used for etching a cavity under at least the photonic crystal are anisotropic chemical etching methods, such as those methods which preferentially etch desired crystal planes of a silicon substrate. Examples of anisotropic chemical etchants are alkali metal hydroxides, hydrazine, ethylenediamine pyrocatechol (EDP), and tetramethyl ammonium hydroxide (TMAH). The alkali metal hydroxides include such oxides as potassium hydroxide (KOH), sodium hydroxide (NaOH), cesium hydroxide (CsOH), rubidium hydroxide (RbOH), and the like. References cited in the article by G. T. A. Kovacs et al. incorporated hereinabove provide detailed information on methods known to those skilled in the art, including masking, relative etch rates (i.e., selectivity), effects of addition of isopropyl alcohol (IPA), and effects of doping the substrate in anisotropic chemical etching with alkali metal hydroxides.

The step of etching a cavity under at least the photonic crystal may be performed by the substeps of directionally etching using a Bosch etching process and isotropically etching to form a particular desired cross-sectional profile of the cavity. The etching process known as the "Bosch etching process" is described in U.S. Pat. Nos. 5,498,312, 5,501,893, and 6,720,268 to Laermer et al., the entire disclosure of each of which is incorporated herein by reference. In this Bosch process, the etching may be performed by time-multiplexing between passivation (i.e., protecting the surface from etching) on the one hand and reactive-ion etching (RIE) on the other hand. The passivation portion may be performed using $CF_4$ gas or $C_4F_8$ gas, for example. The reactive-ion etching (RIE) portion may be performed using $SF_6$ gas. The isotropic-etching part of the etching process to form a particular desired cross-sectional profile of the cavity may be performed by isotropic plasma etching with $SF_6$ gas or by isotropic dry etching with $XeF_2$ gas, for example. As mentioned above, the desired cross-sectional profile of the cavity may be parabolic, and the three-dimensional shape of the cavity, if rotationally symmetric, may be paraboloidal.

Figure 8:
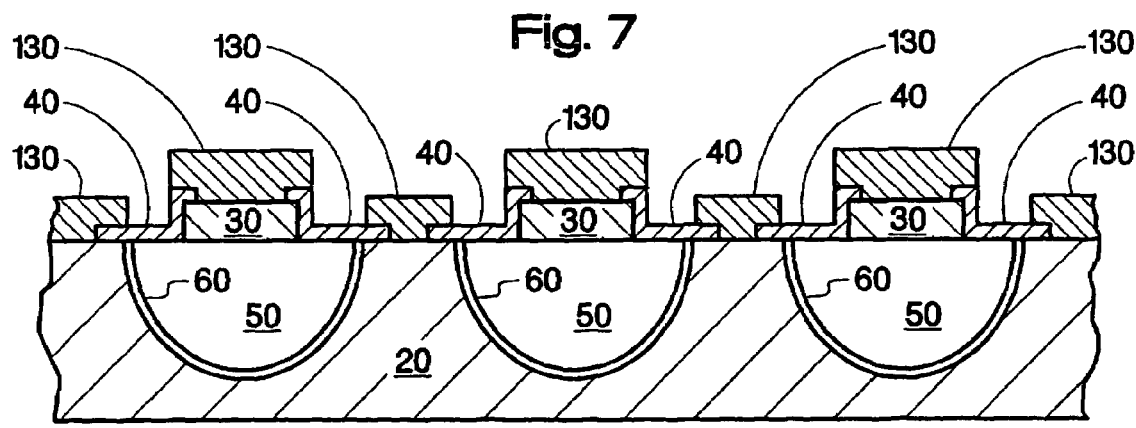

The inner wall of the cavity may be sufficiently reflective without further treatment. In step S60, if necessary, a reflective layer is deposited on the inner wall 55 of the cavity 50. FIG. 8 shows a cross-sectional side elevation view of embodiments of a photonic crystal device after step S60, showing reflective layers 60 on the inner walls of cavities 50. The reflective layer 60 may be deposited by any suitable technique, such as evaporation, sputtering, or chemical vapor deposition. The material and thickness for this reflective layer may be chosen for optimally reflecting light in a particular range of wavelengths of the electromagnetic spectrum. For light in the visible portion of the electromagnetic spectrum, the reflective layer may be aluminum, deposited to a thickness of about 200 nanometers, for example. Silver is another suitable material for a reflective layer. As is known to those skilled in the art, multi-layer reflective films using multiple materials may be made for optimizing reflection in a particular range of wavelengths for particular applications. Thus, the reflective layer deposited on the inner wall of the cavity may be a multi-layer film if desired. A thin transparent layer, e.g. silicon oxide (not shown in the drawings), may be coated over the base reflective layer to protect the reflective material.

Figure 9:
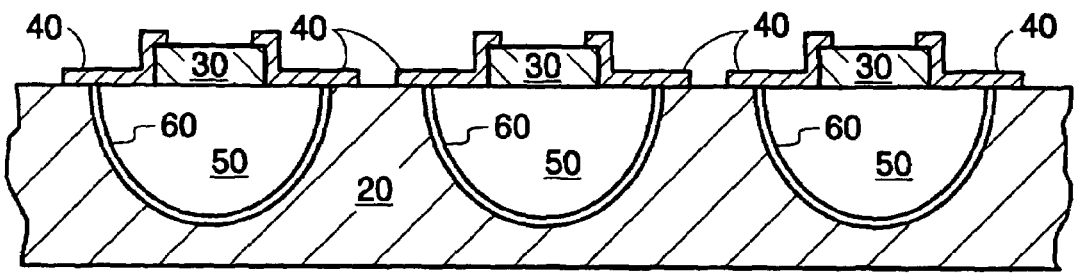

If photoresist 130 is present (decision step S70), the photoresist is removed in step S80. Otherwise, the method embodiment illustrated in FIG. 1 is ended after depositing the reflective coating. FIG. 9 shows a cross-sectional side elevation view of embodiments of a photonic crystal device after step S80, showing that photoresist 130 has been removed.

Figure 10:
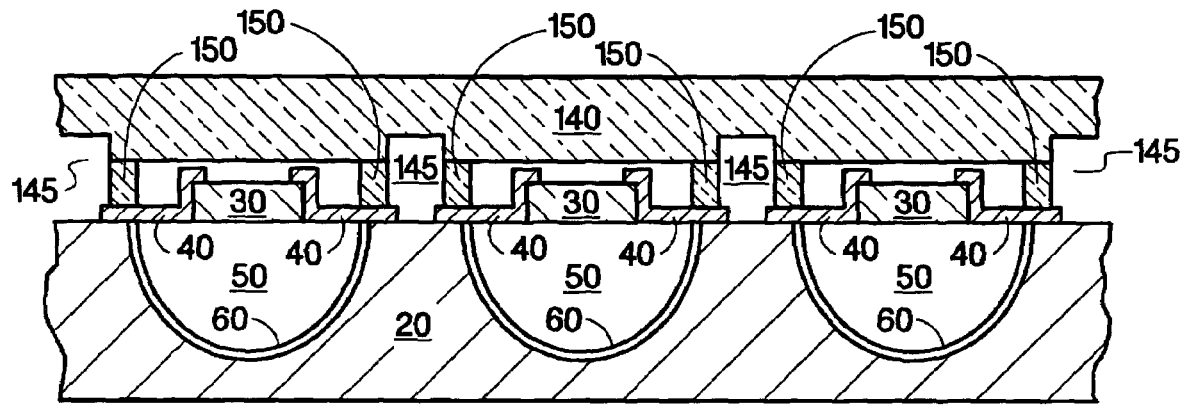
Figure 11:
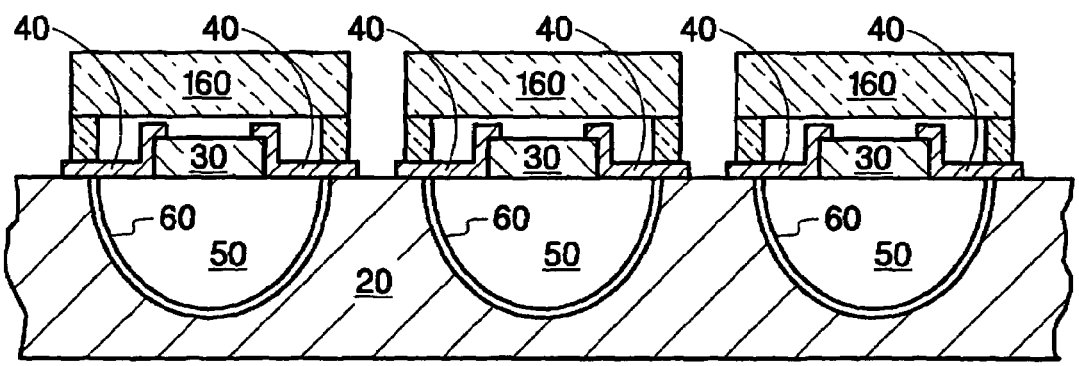
Figure 12:
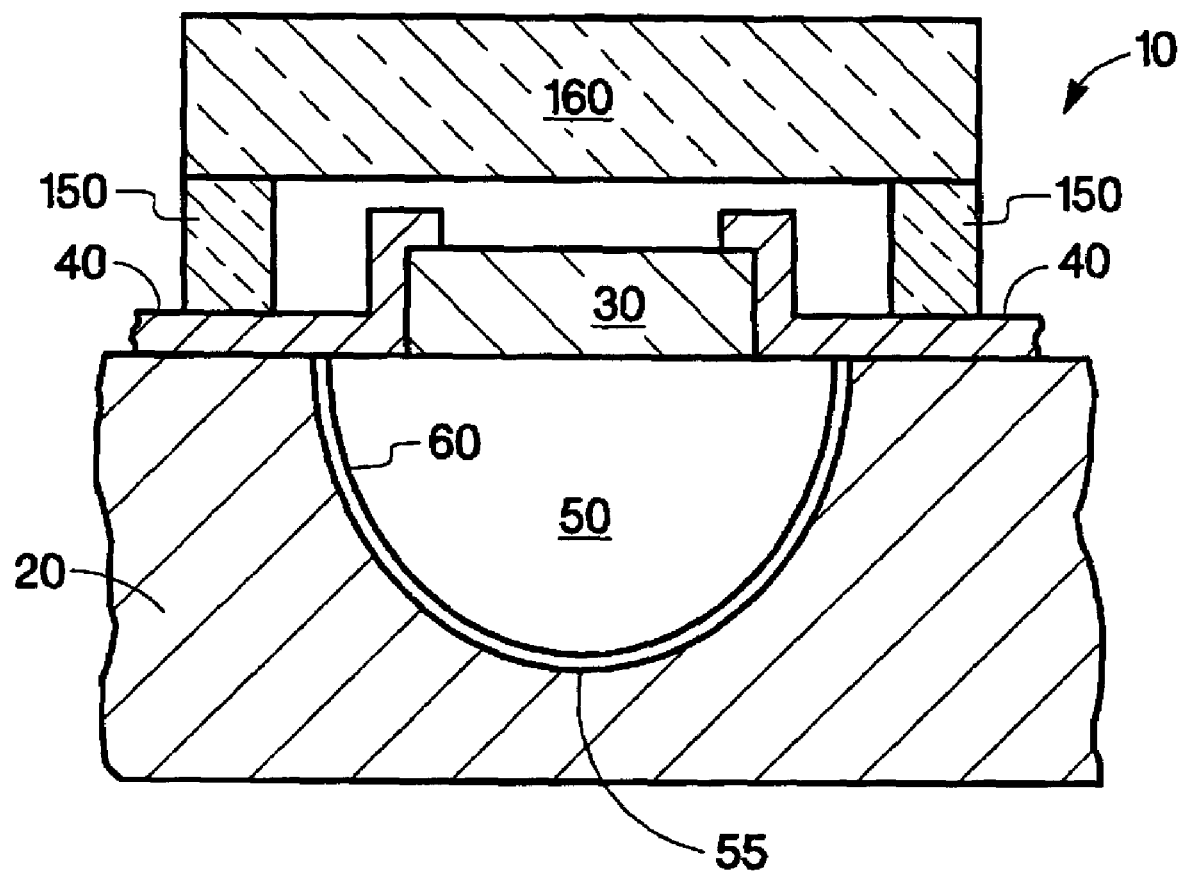
FIG. 12 is a cross-sectional side elevation view of an embodiment of an individual photonic crystal device at completion of its fabrication.

To package the photonic crystal device, further operations may be performed, as illustrated in FIGS. 10, 11, and 12. FIG. 10 shows a cross-sectional side elevation view of embodiments of a photonic crystal device after placing a substantially transparent cover 140 over the photonic crystal devices, spaced above the substrate and the photonic crystal devices by rings 150. Transparent cover 140 may comprise glass, which should be substantially transparent to the wavelengths of light emitted or otherwise processed by the photonic crystal. Transparent cover 140 may be provided with openings 145 suitably spaced to prepare the cover 140 for cutting in a subsequent step, i.e., transparent cover 140 is pre-trenched. The conductive connections 40 extend into these openings 145, and openings 145 span at least a portion of the conductive connections 40. Openings 145 may be formed, for example, by conventional methods of etching the glass through a suitably patterned mask. Transparent cover 140 and rings 150 may comprise glasses of suitable expansion coefficients. Rings 150 may be formed of a glass frit, bonded to the wafer and to the transparent cover 140, sealing a hermetically enclosed environment for photonic crystal device 10. Alternatively, rings 150 may be formed of a gold-tin (AuSn) alloy that may be heated to a temperature suitable to seal the hermetically enclosed environment, provided that suitable precautions are taken to avoid short circuiting conductive connections 40.

FIG. 11 shows a cross-sectional side elevation view of embodiments of a photonic crystal device after cutting through transparent cover 140 at the locations defined by openings 145, thus forming a substantially transparent window 160 over each photonic crystal device. Cutting of transparent cover 140 may be performed by grinding the cover 140, thereby removing the glass bridges that span openings 145.

Singulation may be performed by cutting the wafer to separate each individual photonic crystal device from its neighbors on the wafer. An individual photonic crystal device as packaged by the steps just described is shown in FIG. 12.

Figure 2:
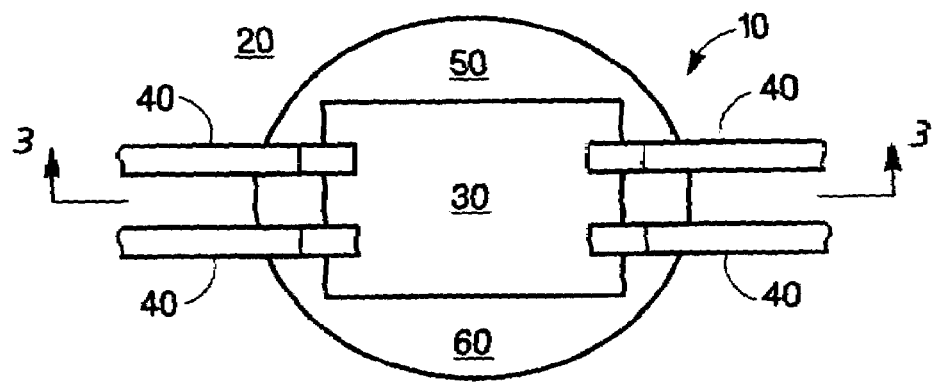
FIG. 2 is a top plan view of an embodiment of a photonic crystal device.
Figure 3:
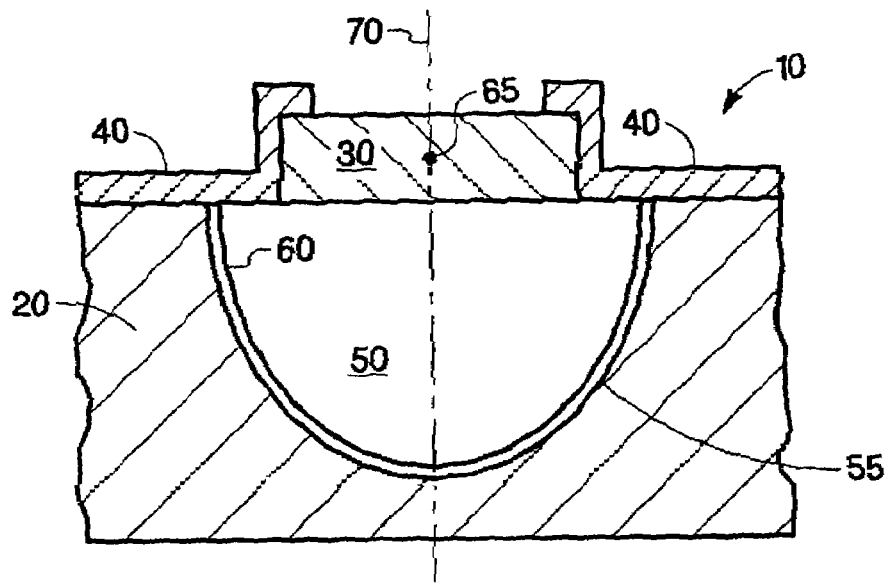
FIG. 3 is a cross-sectional side elevation view of an embodiment of a photonic crystal device.

Another aspect of the present invention provides structural embodiments of photonic crystal devices. An embodiment of a photonic crystal device 10, made in accordance with the present invention, is shown in FIGS. 2 and 3. FIG. 2 is a top plan view of such an embodiment, and FIG. 3 is a cross-sectional side elevation view. The embodiment of a photonic crystal device shown includes a substrate 20 and a cavity 50 extending into the substrate from the top surface of the substrate. Cavity 50 is formed under at least the photonic crystal 30. For some applications, cavity 50 may extend laterally beyond the edges of photonic crystal 30, as it does in the embodiment shown. Cavity 50 has a reflective layer 60 on its inner wall, which faces the general direction of photonic crystal 30. The reflective layer 60 on the inner wall of the cavity may comprise a reflective layer of aluminum, for example. The photonic crystal 30 is disposed above cavity 50 and aligned with it. Conductive connections 40, if required, are electrically coupled to the photonic crystal. The geometric axis 70 of cavity 50 is shown in FIG. 3, extending vertically through a point 65 within photonic crystal 30. In the embodiment shown, axis 70 is also the optical axis of cavity 50.

Figure 4:
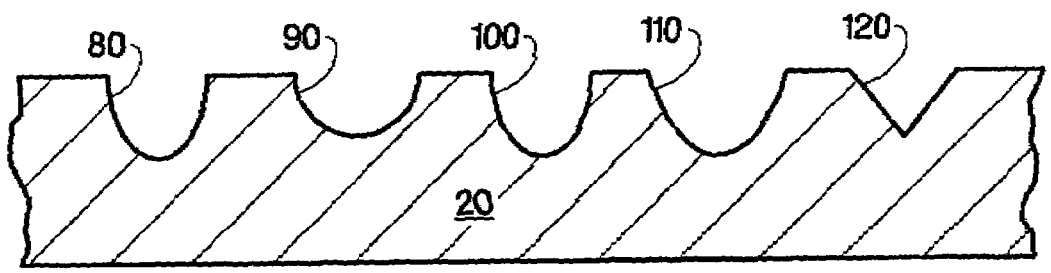
FIG. 4 is a cross-sectional side elevation view illustrating embodiments of various cavity shapes for a photonic crystal device.

FIG. 4 is a cross-sectional side elevation view illustrating schematically embodiments of various shapes of cavity 50 for a photonic crystal device. Reflective layer 60 is not shown in FIG. 4, but the inner walls of the cavities in FIG. 4 are to be considered reflective.

As shown in FIG. 4, the reflective inner wall of cavity 50 may have a cross-sectional profile corresponding to a conic section. For example, the inner wall of the cavity may have a cross-sectional profile that is a parabolic curve 80, a circular arc 90, an elliptical curve 100, a hyperbolic curve 110, or a triangular profile 120. As mentioned above, it is sometimes advantageous to form the reflective inner wall of the cavity with a parabolic cross-sectional profile 80. While FIG. 4 is a two-dimensional cross-sectional view, those skilled in the art will recognize that each of the cross-sectional profiles shown in FIG. 4 may be rotated about its vertical axes, such as axis 70 in FIG. 3, to form a curved surface of revolution in three dimensions. Thus, the profiles shown may be profiles of rotationally symmetric cavities having a paraboloidal shape, a spheroidal shape, an ellipsoidal shape, a hyperboloidal shape, or a conical shape, corresponding to profiles 80, 90, 100, 110, and 120 respectively. Some of these curved surfaces of revolution have a focal point, and the focal point of the reflective inner wall of the cavity may be disposed in the photonic crystal, e.g., at point 65 shown in FIG. 3. For example, if reflective layer 60 of cavity 50 in FIG. 3 has a paraboloidal shape with axis 70, and if the focal point of the paraboloid is at point 65 within photonic crystal 30, then light passing through point 65 and illuminating reflective layer 60 will be reflected generally in a direction parallel to axis 70. In this example and other similar examples, the central axis 70 of the reflective inner wall of cavity 50 may be oriented substantially perpendicular to photonic crystal 30. Similarly, the central axis 70 of the reflective inner wall of the cavity may be arranged to pass through photonic crystal 30.

For some applications, the reflective inner wall of the cavity may adapted to allow light to pass more than once through at least a portion of the photonic crystal. For example, light incident from the top of FIG. 3, passing through photonic crystal 30 in a downward direction, is reflected by reflective layer 60 of cavity 50, and after reflection that light may pass through at least some portion of photonic crystal 30 in an upward direction.

Thus, various embodiments of a photonic crystal device made in accordance with the present invention have a photonic crystal 30 for processing light, conductive elements 40 electrically coupled to the photonic crystal, a substrate 20 for supporting both the photonic crystal and the conductive elements, and a reflective element 60 for reflecting light processed by the photonic crystal. The reflective element 60 is disposed in a cavity 50 under the photonic crystal and aligned with the photonic crystal. The cavity, and thus the reflective element 60, is formed with a desired shape, e.g., a paraboloidal shape. The reflective element may have a central axis 70, oriented substantially perpendicular to the photonic crystal 30, and central axis 70 may be disposed to pass through the photonic crystal. Reflective element 60 may have a focal point, disposed in the photonic crystal 30.

INDUSTRIAL APPLICABILITY

The methods and apparatus of the present invention are useful for fabricating photonic-crystal devices having desired light-emission properties and/or light-processing properties. The methods and apparatus are also useful for electro-optical devices such as light sources incorporating such photonic-crystal devices. The devices may be made by methods adapted for mass production with high yield and relatively low cost.

Although the foregoing has been a description and illustration of specific embodiments of the invention, various modifications and changes thereto can be made by persons skilled in the art without departing from the scope and spirit of the invention as defined by the following claims. For example, the order of process steps may be varied. Various functionally equivalent materials may be substituted for materials used as examples in this description. The photonic crystal element itself may be made by methods other than those described herein, either in situ or as a discrete element. For another example, photonic-crystal devices made in accordance with the invention may have anisotropic electromagnetic emission properties, with emission varying according to the band-gaps for electromagnetic wave propagation along various crystallographic directions of the photonic crystal of the device. For another example, the cavity and the reflective coating on the inner wall of the cavity may be subdivided into multiple smaller cavities, suitably disposed.

What is claimed is:

1. A method for fabricating a photonic crystal device, comprising the steps of:
   a) providing a substrate,
   b) providing a photonic crystal on the substrate,
   c) etching a cavity under at least the photonic crystal, the cavity having an inner wall adapted to reflect light, wherein the inner wall has a focal point, the focal point of the inner wall being disposed in the photonic crystal.

2. The method of claim 1, further comprising the step of:
   d) forming conductive connections electrically coupled to the photonic crystal.

3. The method of claim 1, wherein the inner wall of the cavity is adapted to reflect light by depositing a reflective layer on the inner wall of the cavity.

4. The method of claim 1, further comprising the step of:
   d) depositing a reflective layer on the inner wall of the cavity.

5. The method of claim 4, wherein step d) of depositing a reflective layer on the inner wall of the cavity is performed by depositing aluminum or an alloy thereof.

6. The method of claim 4, wherein step d) of depositing a reflective layer on the inner wall of the cavity is performed by depositing a multi-layer reflective film.

7. The method of claim 1, further comprising the step of:
   d) applying a layer of photoresist over the photonic crystal and patterning the layer of photoresist before performing step c) of etching a cavity under at least the photonic crystal.

8. The method of claim 7, further comprising the step of:
   e) removing the photoresist.

9. The method of claim 1, wherein step c) of etching a cavity under at least the photonic crystal includes forming the cavity with a cross-sectional profile corresponding to a conic section.

10. The method of claim 1, wherein step c) of etching a cavity under at least the photonic crystal includes forming the cavity with a cross-sectional profile selected from the list consisting of a circular arc, an elliptical curve, a hyperbolic curve, and a parabolic curve.

11. The method of claim 1, wherein step c) of etching a cavity under at least the photonic crystal includes forming the cavity with a parabolic cross-sectional profile.

12. The method of claim 1, wherein step c) of etching a cavity under at least the photonic crystal includes forming a curved surface of revolution.

13. The method of claim 1, wherein step c) of etching a cavity under at least the photonic crystal includes forming a cavity shape selected from the list consisting of a conical shape, a spheroidal shape, an ellipsoidal shape, a hyperboloidal shape, and a paraboloidal shape.

14. The method of claim 1, wherein step c) of etching a cavity under at least the photonic crystal includes forming a paraboloidal cavity.

15. The method of claim 14, wherein the paraboloidal cavity has a focal point disposed within the photonic crystal.

16. The method of claim 1, wherein step c) of etching a cavity under at least the photonic crystal includes forming a cavity having a focal point disposed along an axis passing through the photonic crystal.

17. The method of claim 1, wherein step c) of etching a cavity under at least the photonic crystal includes forming a cavity having a focal point disposed within the photonic crystal.

18. The method of claim 1, wherein step a) of providing a substrate comprises providing a silicon substrate.

19. The method of claim 18, wherein step c) of etching a cavity under at least the photonic crystal includes anisotropic chemical etching.

20. The method of claim 18, wherein step c) of etching a cavity under at least the photonic crystal includes preferentially etching desired crystal planes of the silicon substrate.

21. The method of claim 20, wherein step c) of etching a cavity under at least the photonic crystal by preferentially etching includes anisotropic chemical etching with a substance selected from the list consisting of potassium hydroxide (KOH), hydrazine, ethylenediamine pyrocatechol (EDP), and tetramethyl ammonium hydroxide (TMAH).

22. The method of claim 1, wherein step c) of etching a cavity under at least the photonic crystal is performed by the substeps of:
   i) directionally etching using a Bosch etching process, and
   ii) isotropically etching to form a desired cross-sectional profile of the cavity.

23. The method of claim 22, wherein the Bosch process of substep i) is performed by time-multiplexing between passivation and reactive-ion etching (RIE).

24. The method of claim 23, wherein the passivation is performed using $CF_4$ gas.

25. The method of claim 23, wherein the passivation is performed using $C_4F_8$ gas.

26. The method of claim 23, wherein the reactive-ion etching (RIE) is performed using $SF_6$ gas.

27. The method of claim 22, wherein substep ii) is performed by isotropic plasma etching with $SF_6$ gas.

28. The method of claim 27, wherein the desired cross-sectional profile of the cavity is parabolic.

29. The method of claim 22, wherein substep ii) is performed by isotropic dry etching with $XeF_2$ gas.

30. The method of claim 29, wherein the desired cross-sectional profile of the cavity is parabolic.

31. The method of claim 22, wherein the desired cross-sectional profile of the cavity is parabolic.

32. The method of claim 1, further comprising the steps of:
   h) providing a substantially transparent cover,
   i) providing a ring of sealing material disposed between the substantially transparent cover and the substrate, and
   j) sealing the ring of sealing material to at least the substrate and to the substantially transparent cover, whereby a hermetically enclosed environment is formed enclosing the photonic crystal.

33. The method of claim 32, wherein the substantially transparent cover is provided with pre-trenched openings adapted to span at least a portion of the conductive connections.

34. The method of claim 33, wherein the ring of sealing material comprises glass frit.

35. The method of claim 33, wherein the ring of sealing material comprises a metallic alloy.

36. The method of claim 35, wherein the metallic alloy of the ring of sealing material comprises a gold-tin alloy.

37. A photonic crystal device made by the method of claim 32.

38. A photonic crystal device made by the method of claim 1.

39. A method for fabricating a photonic crystal device, comprising the steps of:
   a) providing a substrate,
   b) providing a photonic crystal on the substrate,
   c) applying a layer of photoresist over the photonic crystal,
   d) patterning the layer of photoresist,
   e) etching a cavity under at least the photonic crystal, the cavity having an inner wall, the inner wall of the cavity having a parabolic cross-sectional profile,
   f) depositing a reflective layer on the inner wall of the cavity, wherein the inner wall has a focal point, the focal point of the inner wall being disposed in the photonic crystal, and
   g) removing the photoresist.

40. A photonic crystal device made by the method of claim 39.

41. The method of claim 39, further comprising the step of:
   h) forming conductive connections electrically coupled to the photonic crystal.

42. A photonic crystal device made by the method of claim 41.

43. A photonic crystal device, comprising:
   a) a substrate having a top surface,
   b) a cavity extending from the top surface into the substrate, the cavity having a reflective inner wall and having a cross-sectional profile corresponding to a conic section, wherein the reflective inner wall has a focal point, c) a photonic crystal disposed above and aligned with the cavity, the focal point of the reflective inner wall being disposed in the photonic crystal, and d) conductive connections electrically coupled to the photonic crystal.

44. The photonic crystal device of claim 43, wherein the reflective inner wall of the cavity comprises a layer of aluminum.

45. The photonic crystal device of claim 43, wherein the reflective inner wall of the cavity comprises a multi-layer reflective film.

46. The photonic crystal device of claim 43, wherein the reflective inner wall of the cavity has a cross-sectional profile selected from the list consisting of a circular arc, an elliptical curve, a hyperbolic curve, and a parabolic curve.

47. The photonic crystal device of claim 43, wherein the reflective inner wall of the cavity has a parabolic cross-sectional profile.

48. The photonic crystal device of claim 43, wherein the reflective inner wall of the cavity is a curved surface of revolution.

49. The photonic crystal device of claim 43, wherein the reflective inner wall of the cavity has a shape selected from the list consisting of a conical shape, a spheroidal shape, an ellipsoidal shape, a hyperboloidal shape, and a paraboloidal shape.

50. The photonic crystal device of claim 43, wherein the reflective inner wall of the cavity has a paraboloidal shape.

51. The photonic crystal device of claim 50, wherein the paraboloidal shape of the reflective inner wall of the cavity has a central axis, the central axis being oriented substantially perpendicular to the photonic crystal.

52. The photonic crystal device of claim 51, wherein the central axis of the paraboloidal shape of the reflective inner wall of the cavity is disposed to pass through the photonic crystal.

53. The photonic crystal device of claim 43, wherein the reflective inner wall of the cavity is adapted to direct light for processing more than once by the photonic crystal.

54. A photonic crystal device, comprising:

a) photonic crystal means for processing light, b) means for conducting electricity, electrically coupled to the photonic crystal means, c) means for supporting both the photonic crystal means for processing light and the means for conducting electricity, and d) reflective means for reflecting light processed by the photonic crystal means, the reflective means having a cross-sectional profile corresponding to a conic section, the reflective means being disposed under and aligned with the photonic crystal means for processing light, and the reflective means having a focal point, the focal point being disposed in the photonic crystal means for processing light.

55. The photonic crystal device of claim 54, wherein the reflective means has a paraboloidal shape.

56. The photonic crystal device of claim 55, wherein the paraboloidal shape of the reflective means has a central axis, the central axis being oriented substantially perpendicular to the photonic crystal means for processing light.

57. The photonic crystal device of claim 56, wherein the central axis of the paraboloidal shape of the reflective means is disposed to pass through the photonic crystal.

58. The photonic crystal device of claim 54, wherein the reflective means is adapted to direct light for processing more than once by the photonic crystal.

* * * * *